(12) United States Patent
Pan et al.

(10) Patent No.: US 10,889,372 B2
(45) Date of Patent: Jan. 12, 2021

(54) FOLLOW FOCUS DEVICES, AND REMOTE-CONTROL FOLLOW FOCUS SYSTEMS AND AERIAL VEHICLES WITH FOLLOW FOCUS DEVICES

(71) Applicant: SZ DJI TECHNOLOGY CO., LTD., Shenzhen (CN)

(72) Inventors: Paul Pan, Shenzhen (CN); Fangming Ye, Shenzhen (CN)

(73) Assignee: SZ DJI TECHNOLOGY CO., LTD., Shenzhen (CN)

(*) Notice: Subject to any disclaimer, the term of this patent is extended or adjusted under 35 U.S.C. 154(b) by 579 days.

(21) Appl. No.: 15/793,156

(22) Filed: Oct. 25, 2017

(65) Prior Publication Data

US 2018/0044017 A1 Feb. 15, 2018

Related U.S. Application Data

(63) Continuation of application No. PCT/CN2015/077879, filed on Apr. 29, 2015.

(51) Int. Cl.
*B64C 39/02* (2006.01)
*G03B 13/34* (2006.01)
(Continued)

(52) U.S. Cl.
CPC ............ *B64C 39/024* (2013.01); *G03B 3/10* (2013.01); *G03B 13/34* (2013.01); *H04N 5/232* (2013.01); *H04N 5/23206* (2013.01); *H04N 5/23212* (2013.01); *B64C 2201/127* (2013.01); *G03B 15/00* (2013.01); *H04N 5/23241* (2013.01)

(58) Field of Classification Search
None
See application file for complete search history.

(56) References Cited

U.S. PATENT DOCUMENTS 4,374,613 A * 2/1983 Stempeck ................ G02B 7/40
396/137
5,900,925 A * 5/1999 Navarro .................. H04N 5/232
352/53
(Continued)

FOREIGN PATENT DOCUMENTS

CN 101606387 A 12/2009
CN 102801914 A * 11/2012 ............. H04N 5/232
(Continued)

OTHER PUBLICATIONS

The World Intellectual Property Organization (WIPO) International Search Report for PCT/CN2015/077879 Jun. 30, 2015 8 Pages.

*Primary Examiner* — Nicholas K Wiltey
(74) *Attorney, Agent, or Firm* — Anova Law Group, PLLC

(57) ABSTRACT

A follow focus device includes a signal receiver, a controller electrically connected to the signal receiver, and a control interface electrically connected to the controller and configured to be electrically connected to a camera device. The signal receiver is configured to receive a control instruction for controlling a focal length of a lens of the camera device and send the control instruction to the controller. The controller is configured to generate a control signal according to the control instruction and send the control signal to the camera device via the control interface.

10 Claims, 3 Drawing Sheets

(51) Int. Cl.
   *G03B 3/10*     (2006.01)
   *H04N 5/232*    (2006.01)
   *G03B 15/00*    (2006.01)

(56) References Cited

U.S. PATENT DOCUMENTS

| | | | | |
|---|---|---|---|---|
| 2008/0225234 | A1* | 9/2008 | Bauer | H04N 5/23212 352/140 |
| 2010/0259669 | A1* | 10/2010 | Wood | G03B 348/56 348/345 |
| 2010/0277587 | A1* | 11/2010 | Pechatnikov | H04N 5/23238 348/144 |
| 2012/0301125 | A1* | 11/2012 | Ashida | H04N 5/2351 396/95 |
| 2013/0271619 | A1* | 10/2013 | Longmore | H04N 5/232 348/211.99 |
| 2014/0016920 | A1* | 1/2014 | Luo | G03B 13/35 396/144 |
| 2014/0055874 | A1* | 2/2014 | Tsukagoshi | G02B 7/08 359/823 |
| 2015/0138427 | A1* | 5/2015 | Kennedy | H04N 5/225251 348/345 |
| 2015/0168809 | A1* | 6/2015 | Kamiya | H04N 5/23203 348/341 |
| 2015/0286028 | A1* | 10/2015 | McCurry | G03B 13/32 359/825 |
| 2016/0299413 | A1* | 10/2016 | Fee | G02B 7/023 |
| 2017/0034408 | A1* | 2/2017 | Zhang | H04N 5/2252 |
| 2017/0230565 | A1* | 8/2017 | Silva | H04N 5/232933 |
| 2018/0044017 | A1* | 2/2018 | Pan | G03B 13/34 |
| 2018/0046062 | A1* | 2/2018 | Fisher | H04N 5/23203 |
| 2020/0210676 | A1* | 7/2020 | Barnea | G06K 9/0063 |

FOREIGN PATENT DOCUMENTS

| | | |
|---|---|---|
| CN | 102801914 A | 11/2012 |
| CN | 203104632 U | 7/2013 |
| CN | 203104668 U | 7/2013 |

* cited by examiner

FOLLOW FOCUS DEVICES, AND REMOTE-CONTROL FOLLOW FOCUS SYSTEMS AND AERIAL VEHICLES WITH FOLLOW FOCUS DEVICES

CROSS-REFERENCE TO RELATED APPLICATION

This is a continuation application of International Application No. PCT/CN2015/077879, filed on Apr. 29, 2015, the entire contents of which are incorporated herein by reference.

TECHNICAL FIELD

The present disclosure relates to the field of remote-control shooting, and in particular to follow focus devices, and remote-control follow focus systems and aerial vehicles with follow focus devices.

BACKGROUND

Currently, follow focus devices are widely used in the field of imaging systems such as cameras, video cameras and camcorders, for assisting imaging systems in achieving dynamic adjustment and tracking of the focus in the process of shooting or mobile shooting. Generally, when there is a need to operate the focus, zoom and aperture of a lens, a three-channel follow focus device system is usually used. However, since a traditional three-channel follow focus device system cannot directly output electrical signals to control a camera and a controllable module of a camera lens, the three-channel follow focus device system does not apply to most semi-electronic camera systems (e.g. scenarios such as a camera lens having a built-in focusing motor) nowadays. In addition, a traditional three-channel follow focus device system generally involves a relatively large number of cables and the weight thereof is relatively heavy, therefore, it does not apply in conditions such as aerial shooting with unmanned aerial vehicles, which are sensitive to weight.

SUMMARY

In view of the above, it is necessary to provide a follow focus device having a simple structure and being capable of directly outputting a control signal to control an imaging system, and remote-control follow focus systems and aerial vehicles with follow focus devices.

A follow focus device comprises a signal receiver, a controller and a first interface, wherein the signal receiver is electrically connected to the controller, the controller is electrically connected to the first interface, the first interface is used for electrical connection to a camera device, the signal receiver is used for receiving a control instruction to control the focal length of a lens of the camera device to be changed and sending the control instruction to the controller, and the controller is used for generating a corresponding control signal according to the control instruction and sending the control signal to the camera device via the first interface.

Furthermore, the first interface is one of a high definition multimedia interface (HDMI), a standard universal serial bus (USB) interface, a MINI_USB interface, a MICRO_USB interface, a digital visual interface (DVI), a serial digital interface (SDI), a composite video broadcast signal (CVBS) interface, a video graphics array (VGA) interface, and a low-voltage differential signaling (LVDS) interface.

Furthermore, the follow focus device further comprises a second interface, wherein the second interface is electrically used for electrical connection to a first power supply unit, so as to supply power to the follow focus device.

Furthermore, the second interface is one of an HDMI interface, a USB interface, a MINI_USB interface, a MICRO_USB interface, a DVI interface, an SDI interface, a CVBS interface, a VGA interface and an LVDS interface.

Furthermore, the interface type of the second interface is the same as the interface type of the first interface.

Furthermore, the camera device comprises a signal interface, wherein the interface type of the signal interface is the same as the interface type of the first interface, and the first interface is electrically connected to the signal interface via a cable.

Furthermore, the camera device comprises a signal interface, wherein the interface type of the signal interface is different from the interface type of the first interface, and the follow focus device further comprises a signal converter, wherein the signal converter is electrically connected between the first interface and the signal interface and is used for converting a control signal output from the controller via the first interface into a signal adapted to the signal interface.

Furthermore, the follow focus device further comprises a motor and a gear assembly, wherein: the motor is electrically connected to the controller and the gear assembly; the gear assembly is mated with the lens; and the controller sends the control signal to the motor to control the rotation of the motor, and thus drive the rotation of the gear assembly, thereby adjusting a working parameter of the lens.

A follow focus device comprises a signal receiver, a controller and a motor, wherein: the signal receiver is electrically connected to the controller; the signal receiver is used for receiving a control instruction to control a working parameter of a lens of a camera device, and sending the control instruction to the controller; the motor is electrically connected to the controller; and the motor is mated with the lens of the camera device to adjust the working parameters of the lens of the camera device;

Wherein the controller generates a corresponding control signal according to the control instruction, and optionally sends the control signal to the camera device and/or the motor.

Furthermore, the motor comprises at least one of the following: a focus motor for adjusting a focusing parameter of the lens, a zoom motor for adjusting a zooming parameter of the lens, and an aperture motor for adjusting an aperture parameter of the lens.

Furthermore, when the motor is not in operation, the controller directly sends the control signal to the camera device.

Furthermore, the follow focus device further comprises a first interface, wherein the first interface is used for electrical connection to the camera device, and the controller is electrically connected to the first interface and is used for sending the control signal to the camera device via the first interface.

Furthermore, the first interface may be one of a high definition multimedia interface (HDMI), a standard universal serial bus (USB) interface, a MINI_USB interface, a MICRO_USB interface, a digital visual interface (DVI), a serial digital interface (SDI), a composite video broadcast signal (CVBS) interface, a video graphics array (VGA) interface, and a low-voltage differential signaling (LVDS) interface.

Furthermore, the follow focus device further comprises a second interface, wherein the second interface is electrically used for electrical connection to a first power supply unit, so as to supply power to the follow focus device.

Furthermore, the second interface is one of an HDMI interface, a USB interface, a MINI_USB interface, a MICRO_USB interface, a DVI interface, an SDI interface, a CVBS interface, a VGA interface and an LVDS interface.

Furthermore, the interface type of the second interface is the same as the interface type of the first interface.

Furthermore, the camera device comprises a signal interface, wherein the interface type of the signal interface is the same as the interface type of the first interface, and the first interface is electrically connected to the signal interface.

Furthermore, the camera device comprises a signal interface, wherein the interface type of the signal interface is not the same as the interface type of the first interface, and the follow focus device further comprises a signal converter, wherein the signal converter is electrically connected between the first interface and the signal interface and is used for converting a control signal output from the controller via the first interface into a signal adapted to the signal interface.

A remote-control follow focus system comprises a remote controller and the above-mentioned follow focus device, wherein the remote controller communicates with the follow focus device and is used for outputting the control instruction to the follow focus device.

Furthermore, the remote controller comprises a signal sender, wherein the signal sender transmits the control instruction to the signal receiver in a wired and/or wireless manner.

An aerial vehicle comprises a camera device and the above-described remote-control follow focus system, wherein the follow focus device is disposed on the camera device.

Furthermore, the power supply unit is a built-in power supply of the aerial vehicle.

The remote-control follow focus system of the present disclosure can directly connect the first interface to a signal interface of the camera device via a cable, so as to implement functions such as focusing, adjusting a aperture assembly, adjusting shutter speed and turning on/off video recording of the lens of the camera device, thereby enabling the remote-control follow focus system to apply to a camera having an automatic focusing function. In addition, the remote-control follow focus system is further provided with a motor. Therefore, the remote-control follow focus system can directly drive the motor to generate a mechanical motion and then to drive the lens to zoom, so as to be applicable to ordinary cameras, i.e. the remote-control follow focus system can be applied in different types of camera devices. The above-described remote-control follow focus system has a simple structure and the whole weight thereof is relatively light and the cost thereof is relatively low, and therefore, it can widely apply to application scenarios such as aerial shooting, which are sensitive to volume and weight.

DESCRIPTION OF REFERENCE SIGNS FOR MAIN ELEMENTS

Figure 1:
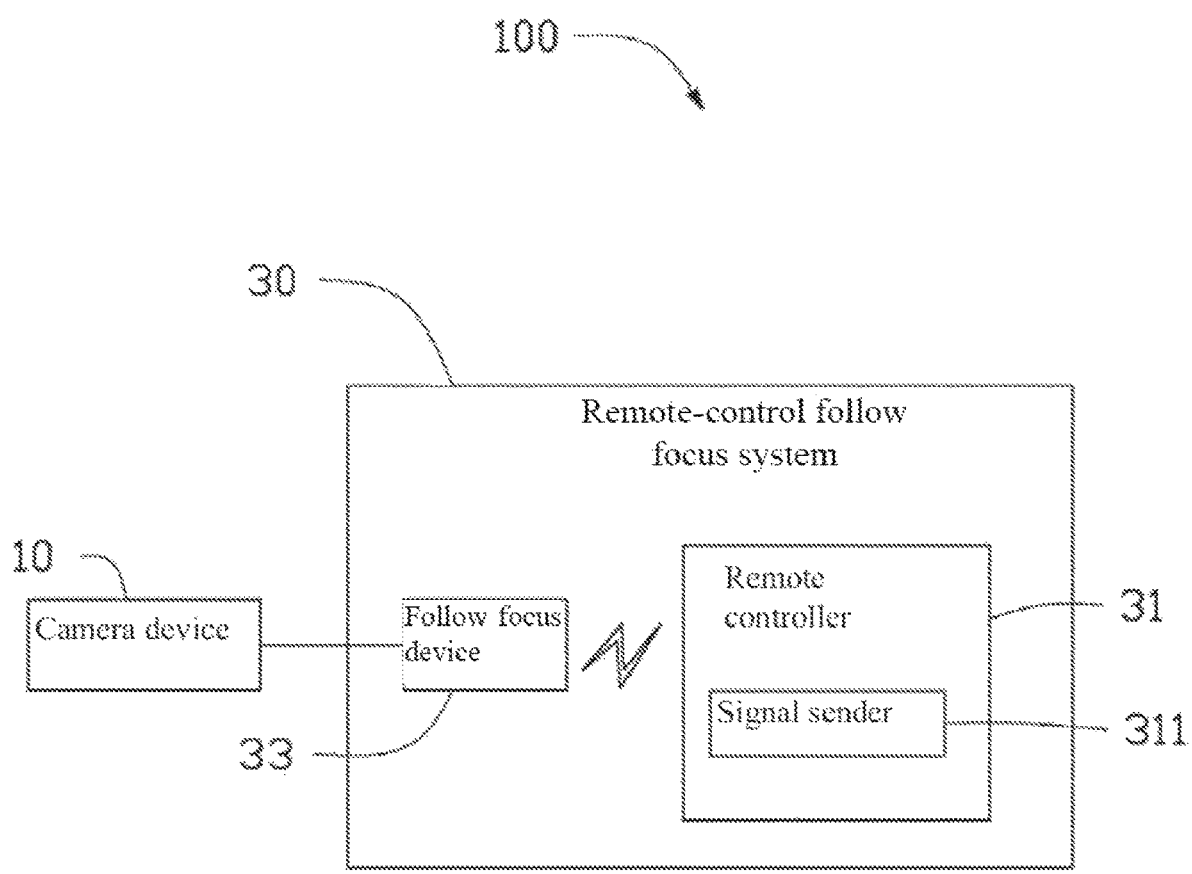
FIG. 1 is a schematic diagram of an application environment of a follow focus device according to an embodiment of the present disclosure.

Aerial vehicle 100
Camera device 10
Machine body 11
Signal interface 111
Lens 13
Remote-control follow focus system 30
Remote controller 31
Signal sender 311
Follow focus device 33
Housing 331
First interface 332
Second interface 333
Signal receiver 334
Controller 335
Motor 336
Gear assembly 337
Signal converter 338
Power supply unit 50

DETAILED DESCRIPTION OF THE EMBODIMENTS

Technical solutions of the present disclosure will be described with reference to the drawings. It will be appreciated that embodiments as described in the disclosure are a part rather than all of the embodiments of the present disclosure. Other embodiments, which are conceived by those having ordinary skills in the art on the basis of the disclosed embodiments without inventive efforts, should fall within the scope of the present disclosure.

With reference to FIG. 1, an embodiment of the present disclosure provides an aerial vehicle 100, comprising a camera device 10 and a remote-control follow focus system 30. The camera device 10 is mounted on the aerial vehicle 100. The remote-control follow focus system 30 comprises a remote controller 31 and a follow focus device 33. The follow focus device 33 is mounted on the camera device 10. The remote controller 31 is used for communicating with the follow focus device 33 and thus controlling the follow focus device 33 to assist the camera device 10 in performing automatic focusing in the process of shooting or mobile shooting.

Figure 2:
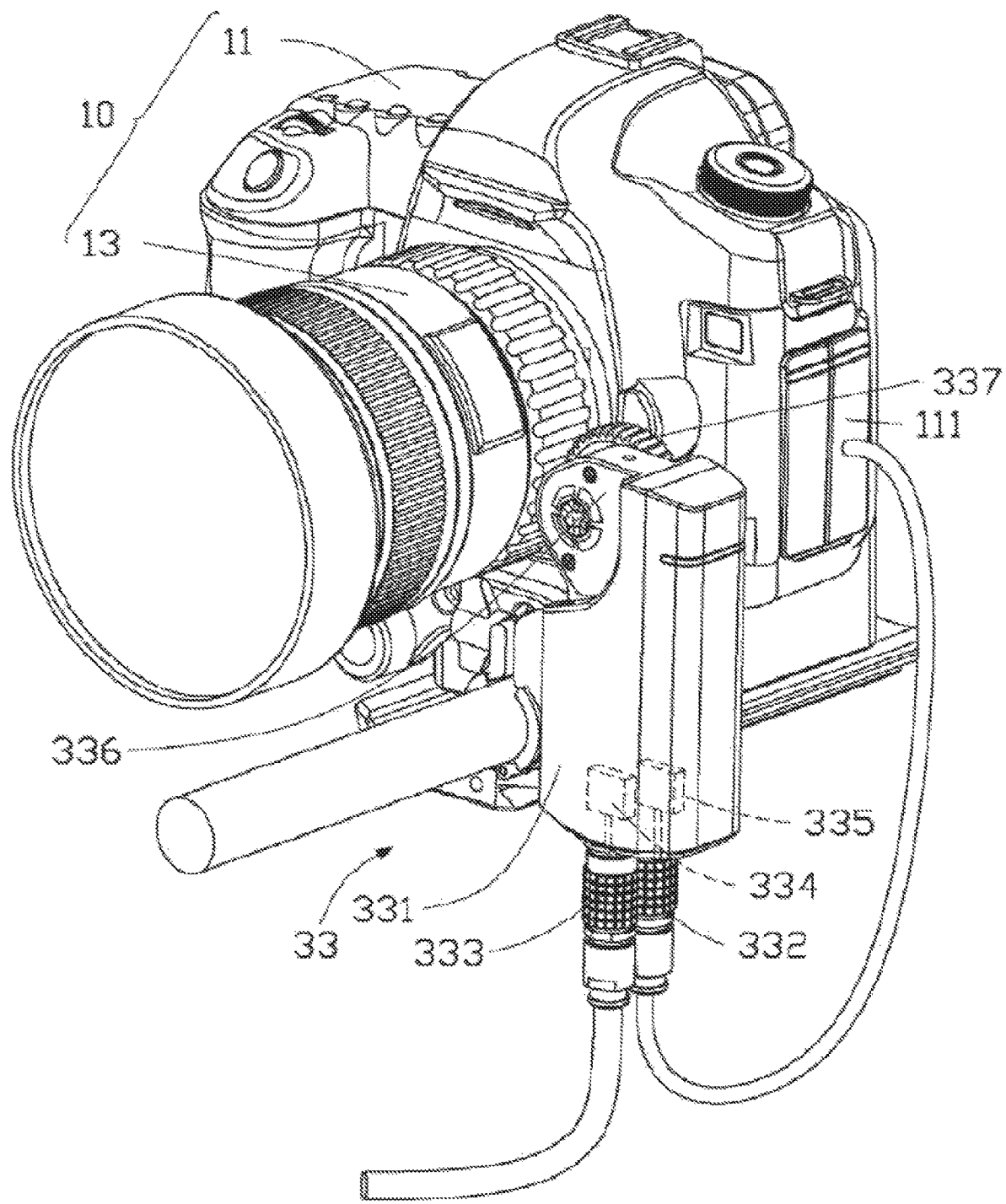
FIG. 2 is an overall schematic diagram of the follow focus device and camera device as shown in FIG. 1.

With reference to FIG. 2, the camera device 10 comprises a machine body 11 and a lens 13 disposed on the machine body 11. In the present embodiment, the camera device 10 is an ordinary camera, i.e. the machine body 11 and the lens 13 are not provided with a focus motor therein. Certainly, in other embodiments, the camera device 10 may also be a camera having the function of automatic focusing, i.e. the machine body 11 or the lens 13 may be provided with a focus motor.

One side of the machine body 11 is provided with a signal interface 111. The signal interface 111 may be one of a high definition multimedia interface (HDMI), a standard universal serial bus (USB) interface, a MINI_USB interface, a MICRO_USB interface, a digital visual interface (DVI), a serial digital interface (SDI), a composite video broadcast signal (CVBS) interface, a video graphics array (VGA)

interface, and a low-voltage differential signaling (LVDS) interface. In the present embodiment, the signal interface 111 is an HDMI interface for being connected to the follow focus device 33 via cables, data lines, etc. and receives a control instruction from the follow focus device 33 according to an HDMI protocol. It can be understood that in other embodiments, the signal interface 111 may also be connected to external devices such as computers, televisions, so that the camera device 10 can perform exchange and transmission of audio and/or image signals with external devices.

The remote controller 31 may be a cell phone, a tablet computer, a notebook computer, a desktop computer, etc. The remote controller 31 comprises a signal sender 311. The signal sender 311 is used for generating a control instruction capable of controlling the focal length of a lens 13 of the camera device 10 to be changed, and transmitting the control instruction to the follow focus device 33 in a wired and/or wireless manner.

Figure 3:
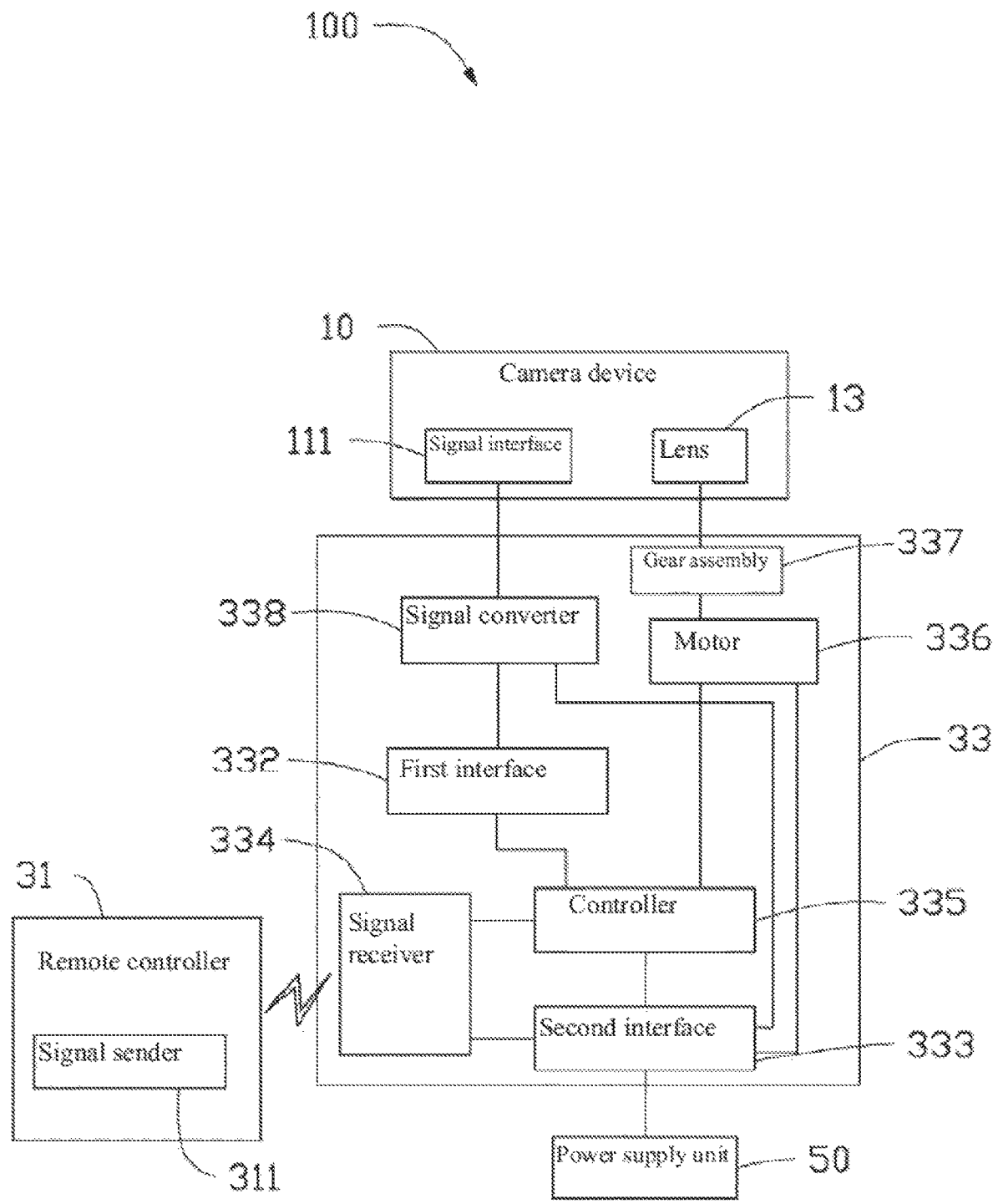
FIG. 3 is a functional block diagram of the follow focus device, camera device and the remote controller as shown in FIG. 1.

With reference to FIG. 3, in the embodiment shown in the figure, the follow focus device 33 comprises a housing 331, a first interface 332, a second interface 333, a signal receiver 334, a controller 335, a motor 336 and a gear assembly 337. The housing 331 is used for accommodating the signal receiver 334 and the controller 335. The first interface 332 and the second interface 333 are both arranged at one side of the housing 331. The first interface 332 may be one of an HDMI interface, a USB interface, a MINI_USB interface, a MICRO_USB interface, a DVI interface, an SDI interface, a CVBS interface, a VGA interface and an LVDS interface.

In the present embodiment, the interface type of the first interface 332 is the same as the interface type of the signal interface 111. As such, one end of the first interface 332 is electrically connected to the controller 335, the other end thereof is directly electrically connected to the signal interface 111 of the camera device 10 via a signal output line (such as a cable), so that the controller 335 establishes an electrical connection with the camera device 10 via the first interface 332 and the signal interface 111.

One end of the second interface 333 is electrically connected to circuit elements, such as the signal receiver 334, the controller 335, and the motor 336, and the other end thereof may be electrically connected to a power supply unit 50 via a cable. As such, the power supply unit 50 may supply power to the circuit elements in the follow focus device 33 via the second interface 333. It can be understood that the power supply unit 50 may be a built-in power supply of the aerial vehicle 100, i.e. the second interface 333 may be directly connected to the built-in power supply of the aerial vehicle 100 via a cable. Certainly, in other embodiments, the power supply unit 50 may also be an additional power supply.

It can be understood that in other embodiments, the interface type of the second interface 333 is the same as the interface type of the first interface 332, such that the second interface 333 can be exchanged with the first interface 332. For example, the first interface 332 is connected to the power supply unit 50 via a cable, while the second interface 333 is connected to the signal interface 111 via a signal output line.

In the present embodiment, the signal receiver 334 and the signal sender 311 communicate with each other in a wireless manner such as via a local area network, wide area network, infrared ray, radio, Wi-Fi, 2G network, 3G network, 4G network, 5G network, point to point (P2P) network, telecommunication network, or cloud network. Alternatively, in wireless communications, a relay station such as a signal tower, a satellite or a mobile base station will be used. Wireless communications may be short-range, or not short-range. Certainly, the signal receiver 334 and the signal sender 311 can perform communication with each other in a wired manner such as using cables, or optical fibers. The signal receiver 334 is also electrically connected to the controller 335, for receiving a control instruction sent from a signal sender 311 in the remote controller 31 and sending the control instruction to the controller 335.

In the present embodiment, the controller 335 is electrically connected to the motor 336, for generating a corresponding control signal according to the received control instruction and thus controlling the rotation of the motor 336 and to drive the rotation of the gear assembly 337. In the present embodiment, the gear assembly 337 is also connected to a zoom ring on the lens 13. As such, when the motor 336 rotates, the motor 336 drives the rotation of the gear assembly 337 and thus controls the lens to change the focal length so as to achieve a self-adaptive zoom effect. That is to say, the follow focus device 33 can apply to an ordinary camera, i.e. a camera having the machine body 11 and the lens 13 that are not provided with a focus motor therein.

It can be understood that in other embodiments, where the camera device 10 need not adjust zoom or the camera device 10 is a camera having an automatic focusing function (i.e. the lens 13 or the machine body 11 has a built-in motor), the motor 336 in the follow focus device 33 is not in operation or can be directly omitted, such that the weight of the follow focus device 33 can be further reduced. In that case, the follow focus device 33 can be separately used as a controller. Particularly, after receiving the control instruction from the remote controller 31 via the signal receiver 334, the controller 335 can generate a corresponding control signal. Furthermore, the controller 335 transmits the control signal to a signal input end, i.e. the signal interface 111, of the camera device 10 via the first interface 332. As such, the control signal can achieve operation control of the camera device 10 by means of a control circuit inside the camera device 10. For example, the controller 335 transmits the control signal to the built-in focus motor inside the camera device 10, and thus performs the automatic focusing function of the lens 13.

Certainly, in other embodiments, the control signal input by the controller 335 to the camera device 10 or the motor 336 via the first interface 332 can be used for adjusting other working parameters of the lens 13 of the camera device 10, for example, a zooming parameter, a aperture parameter, a shutter parameter, a video recording ON/OFF parameter, etc., apart from being used for adjusting a focusing parameter of the lens 13 of the camera device 10.

Accordingly, there may be a plurality of built-in motors inside the camera device 10 or there may be a plurality of motors 336, for example, there may be at least one of the following: a focus motor for adjusting a focusing parameter of the lens 13, a zoom motor for adjusting a zooming parameter of the lens 13, and a aperture motor for adjusting a aperture parameter of the lens 13.

It is important to note that where there are a plurality of motors 336, the plurality of motors 336 are connected in series via a bus, i.e. the controller 335 controls the plurality of motors 336 at the same time via a bus.

It can be understood that since the types of signal interfaces 111 of different types of camera devices 10 may not be the same. When the interface type of the first interface 332 does not match the interface type of the signal interface 111 of the camera device 10, for example, the first interface 332 is a USB interface while the signal interface 111 is an HDMI interface, the follow focus device 33 may further comprise a signal converter 338. The signal converter 338 is used for converting the control signal output via the first interface 332 from the controller 335 into a signal adapted to the signal interface 111 of the camera device 10.

It is important to note that the signal converter 338 may also be a standalone module, i.e. the signal converter 338 can be separately arranged outside the follow focus device 33.

Certainly, the above-mentioned remote-control follow focus system 30 can directly connect the first interface 332 to a signal interface 111 of the camera device 10 via a cable, so as to implement functions such as focusing, adjusting a aperture assembly, adjusting shutter speed and turning on/off video recording of the lens 13 of the camera device 10, thereby enabling the remote-control follow focus system 30 to apply to a camera having a built-in motor. In addition, the remote-control follow focus system 30 is further provided with a motor 336. Therefore, the remote-control follow focus system 30 can directly drive the motor 336 to generate a mechanical motion and then drive the lens 13 to zoom, so as to be adapted to ordinary cameras, i.e. the remote-control follow focus system 30 can apply to different types of camera devices 10. The above-described remote-control follow focus system 30 has a simple structure and the whole weight thereof is relatively light and the cost thereof is relatively low, and therefore, it can widely apply in application scenarios such as aerial shooting which are sensitive to volume and weight.

It can be understood that the camera device 10 can not only be arranged on an aerial vehicle 100, but can also be arranged on other static or movable objects. Herein the static objects may be buildings (for example, guideboards, billboards, columns, cross bars, walls, etc.) or natural objects (for example, trees, rocks on hills, etc.). The movable objects may be vehicles, ships, humans or animals, etc.

The foregoing disclosure is merely illustrative of the embodiments of the disclosure but not intended to limit the scope of the disclosure. Any equivalent modifications to a structure or process flow, which are made without departing from the specification and the drawings of the disclosure, and a direct or indirect application in other relevant technical fields, shall also fall into the scope of the disclosure.

What is claimed is:

1. A follow focus device, comprising: a camera device; a signal receiver; a controller electrically connected to the signal receiver; a control interface configured to be electrically connected to a signal interface of the camera device; and a motor and a gear assembly, the motor being coupled to the gear assembly, the gear assembly being mated with a lens of the camera device, wherein: the signal receiver is configured to receive a control instruction for controlling a focal length of the lens of the camera device and send the control instruction to the controller; and the controller is both electrically connected to the motor and electrically connected, via the control interface, to the signal interface of the camera device, and configured to: determine whether the camera device has an automatic focusing function, in response to the camera device having the automatic focusing function, generate a first control signal according to the control instruction, and send the first control signal to a built-in focus motor of the camera device via the control interface to adjust a focus of the lens; and in response to the camera device not having the automatic focusing function, generate a second control signal according to the control instruction, and send the second control signal to the motor of the follow focus device to control a rotation of the gear assembly, thereby adjusting the focus of the lens.

2. The follow focus device of claim 1, wherein the control interface includes one of a high definition multimedia interface (HDMI), a standard universal serial bus (USB) interface, a MINI_USB interface, a MICRO_USB interface, a digital visual interface (DVI), a serial digital interface (SDI), a composite video broadcast signal (CVBS) interface, a video graphics array (VGA) interface, or a low-voltage differential signaling (LVDS) interface.

3. The follow focus device of claim 1, further comprising:
a power interface configured to be electrically connected to a power supply unit to supply power to the follow focus device.

4. The follow focus device of claim 3, wherein the power interface includes one of a high definition multimedia interface (HDMI), a standard universal serial bus (USB) interface, a MINI_USB interface, a MICRO_USB interface, a digital visual interface (DVI), a serial digital interface (SDI), a composite video broadcast signal (CVBS) interface, a video graphics array (VGA) interface, or a low-voltage differential signaling (LVDS) interface.

5. The follow focus device of claim 3, wherein the power interface matches the control interface.

6. The follow focus device of claim 1, wherein the signal interface of the camera device has an interface type matches the control interface.

7. The follow focus device of claim 1,
wherein the signal interface of the camera device does not match with the control interface,
the follow focus device further comprising:
a signal converter electrically connected between the control interface and the signal interface and configured to convert the control signal output from the controller via the control interface into a signal adapted to the signal interface.

8. The follow focus device of claim 1, wherein the motor includes a plurality of motors including a focus motor for adjusting a focusing parameter of the lens, a zoom motor for adjusting a zooming parameter of the lens, and an aperture motor for adjusting an aperture parameter of the lens, wherein: the plurality of motors are connected in series via a bus, and the controller controls the plurality of motors simultaneously via the bus.

9. A remote-control follow focus system, comprising:
the follow focus device of claim 1; and
a remote controller configured to communicate with the follow focus device to transmit the control instruction to the follow focus device.

10. An aerial vehicle, comprising: the remote-control follow focus system of claim 9, wherein the follow focus device is disposed on the camera device.

* * * * *